March 15, 1927.

J. A. JACKSON 1,620,765

CORN POPPER

Filed Feb. 20, 1926

INVENTOR
JOHN A. JACKSON
BY
Earl M. Sinclair
ATTORNEY

Patented Mar. 15, 1927.

1,620,765

UNITED STATES PATENT OFFICE.

JOHN A. JACKSON, OF DES MOINES, IOWA.

CORN POPPER.

Application filed February 20, 1926. Serial No. 89,628.

The invention relates to corn popping devices and more particularly to the class of corn popping attachments for cooking utensils, receptacles, and the like.

The primary object of this invention is to provide a simple, durable and economical device in which the corn to be popped may be conveniently and properly agitated, so as to prevent the scorching or burning thereof during the popping process.

A further object is to provide a corn popper which may be used as a cooking utensil when not used as a popper.

A further object of this invention is to provide a means for securing the lid on the popper while popping the corn thereby preventing the loss of the corn.

A further object is to provide a means for securing to and supporting the stirring members on the lid or cover of the device.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Figure 1:
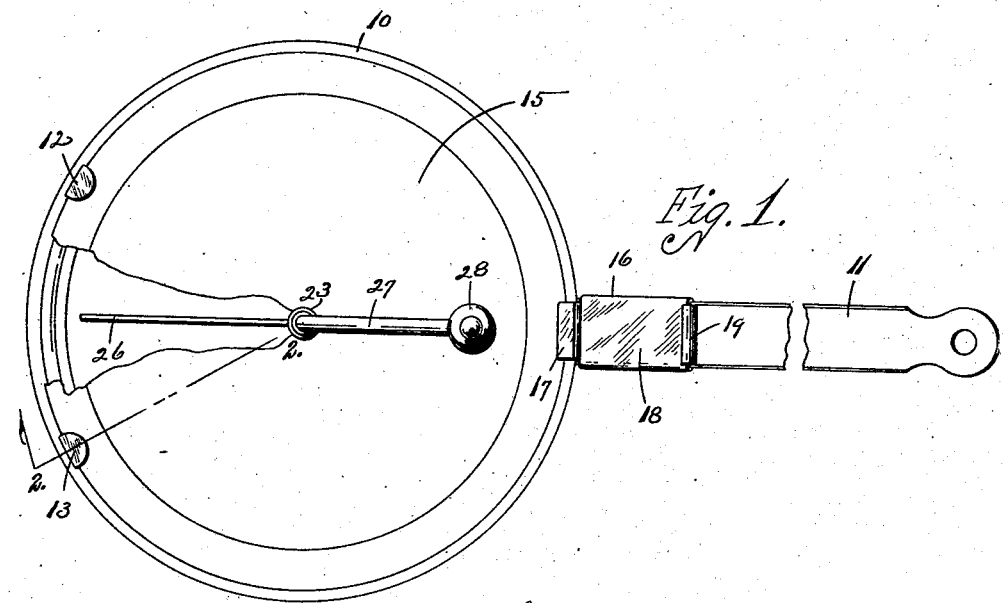
Fig. 1 is a top plan view of my complete device ready for use. A portion of the cover is cut away to more fully illustrate the stirring means.
Figure 2:
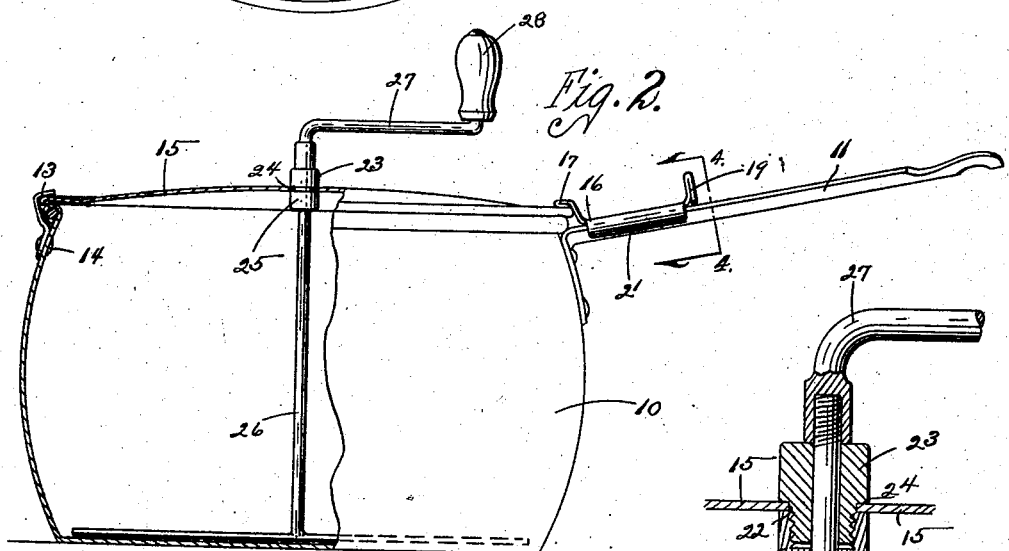
Fig. 2 is a side sectional view of my corn popper ready for use. A portion of the side is cut away to show the interior and is taken on line 2—2 of Fig. 1.
Figure 3:
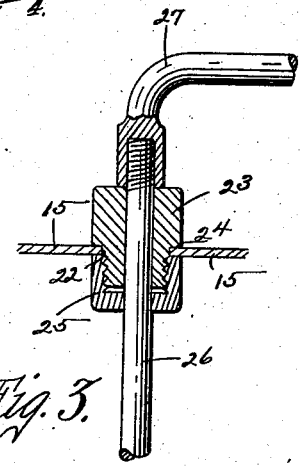
Fig. 3 shows the means employed to secure the stirring means to the cover of the popper.
Figure 4:
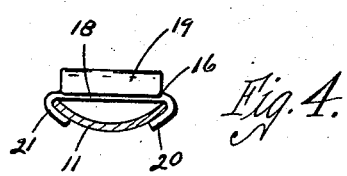
Fig. 4 is an end view of the sliding catch for holding the cover on the device and is taken on line 4—4 of Fig. 2.

I have used the numeral 10 to designate the hollow cylindrical container or pot in which the corn is to be popped. Secured to this pot is the ordinary pot handle 11. Near the top marginal edge of the pot, spaced apart and on opposite the side the handle 11, are two ears or tongues 12 and 13 each secured on the outside of the pot by a rivet 14. These ears each extend upward a slight distance above the top marginal edge of the pot and then inward toward the center as shown in Fig. 1. The numeral 15 designates a cover designed to close the top of the pot 10. To properly place on the pot and engage the top marginal edge of the same, this cover is slipped under the ears 12 and 13, thereby holding the same from upward movement at this location. Slidably mounted on the handle 11 is the catch 16 designed to be pushed downwardly on the handle and hold the cover 15 securely on the pot. This is accomplished by the projection 17 formed on the base portion 18 of the catch member 16 extending over and engaging the edge of the cover 15 as is shown in Fig. 1 and Fig. 2. At the rear end of the base 18 is another projection integrally formed thereon which I have designated by the numeral 19. It acts as a lever to facilitate the thumb in sliding the catch member 16 backwardly and forwardly. The catch member is slidably mounted on the handle by having the ears 20 and 21 that extend from the sides of the base portion 16 bent around the handle 11, as is shown in Fig. 4. By this arrangement when the cover 15 is on the pot 10 and under the ears 12 and 13 and the member 16 is pushed forward the cover will be rigidly held on the pot. By sliding the catch member 16 back on the handle the cover may be easily lifted from the pot. In the cover 15 and near the center thereof is the hole 22 into which extends the bearing member 23 having the shoulder 24 which engages the top marginal edge of the hole 22 and prevents the same from further entrance in the said hole. Threaded onto the portion of the bearing member 23 that extends through the hole 22 and engaging the undermarginal edge of the hole 22 is the internally threaded member 25. Extending through a hole in the members 23 and 25 is the stirring member 26 which is of T construction as is shown in Fig. 2. The portion which normally extends through the hole and above the bearing member 23 is threaded to receive the crank arm 27 having the knob 28. By this arrangement the end of the crank arm rests on the bearing member 23 and holds the stirrer a slight distance from the bottom of the pot.

The practical operation of the device is as follows:

Remove the cover and place the corn to be popped in the pot 10. Replace the cover and push the member 16 forward so that the cover will be securely held on the pot. As the corn is popping rotate the crank arm 27 to the right. One of the main features of my device is the ease with which it may be dismounted. By sliding the member 16 back on the handle the complete stirring mechanism and cover may be removed from the pot and the same used as an ordinary cooking utensil. By rotating the crank arm 27 to the left it will unscrew itself from the stirring member and the stirring member and crank arm may be removed from the cover. By unscrewing the member 25 from the bearing member 23 the two members may be removed from the cover 15.

Some changes may be made in construction and arrangement of my improved corn popper without departing from the real spirit and purpose of my invention and it is my intention to cover by my claims any modified forms of structure or use of mechanical equivalents which may be reasonably included within their scope.

I claim:

1. In combination, a vessel, a removable cover therefor, a handle on said vessel, an ear secured to the outside of said vessel and extending over the periphery of the removable cover when the same is on the vessel, a catch member having a base portion, ears extending from said base portion and bent around said handle, a projection extending from said base portion designed to overlap the said cover when the catch member is pushed forward on the said handle, and a stirring means extending through and supported by said cover.

2. In combination, a vessel, a removable cover therefor, a handle on said vessel, an ear secured to the outside of said vessel and extending over the periphery of the removable cover when the same is on the vessel, a catch member having a base portion, ears extending from said base portion and bent around said handle, a projection extending from said base portion designed to overlap the said cover when the catch member is pushed forwardly on the said handle, a handle member formed on said base member to facilitate the sliding of the catch member on said handle, and a stirring means extending through and supported by said cover.

3. In combination, a vessel, a removable cover therefor, a handle on said vessel, ears secured to the outside of said vessel and on the side opposite the side the said handle is on; said ears extending over the periphery of the said cover, a catch member having a base portion, ears extending from said base portion and bent around said handle, a projection extending from said base portion designed to overlap the said cover when the catch member is pushed forward on the said handle, a gripping member on said catch member for facilitating the actuating of the same, and a stirring means extending through and supported by said cover.

JOHN A. JACKSON.